United States Patent
Rouault De Coligny (10) Patent No.: US 8,714,739 B2
(45) Date of Patent: May 6, 2014

(54) PRODUCT COMPRISING A FLEXIBLE OPHTALMIC LENS, AND METHOD FOR MOUNTING SUCH A FLEXIBLE OPHTALMIC LENS ON AN EYEGLASSES LENS

(75) Inventor: Pierre Rouault De Coligny, Charenton le Pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 159 days.

(21) Appl. No.: 13/319,416

(22) PCT Filed: Apr. 19, 2010

(86) PCT No.: PCT/FR2010/000318
§ 371 (c)(1),
(2), (4) Date: Dec. 8, 2011

(87) PCT Pub. No.: WO2010/130885
PCT Pub. Date: Nov. 18, 2010

(65) Prior Publication Data
US 2012/0086908 A1    Apr. 12, 2012

(30) Foreign Application Priority Data

May 11, 2009    (FR) ..................... 09 02253

(51) Int. Cl.
*G02C 13/00* (2006.01)
*G02C 3/00* (2006.01)
*G02C 7/16* (2006.01)

(52) U.S. Cl.
CPC *G02C 13/00* (2013.01); *G02C 3/00* (2013.01); *G02C 7/16* (2013.01)
USPC ..................... 351/159.57; 351/178

(58) Field of Classification Search
CPC .............. G02C 7/02; G02C 3/00; G02C 7/00; G02C 7/16; G02C 13/00; B29D 11/00; B29D 17/00
USPC ............. 351/159.01, 159.57, 159.73, 159.74, 351/159.75, 178; 264/1.1, 1.32
See application file for complete search history.

(56) References Cited

U.S. PATENT DOCUMENTS 3,628,854 A    12/1971    Jampolsky
4,166,088 A    8/1979    Neefe
(Continued)

FOREIGN PATENT DOCUMENTS

| EP | 1 684 097 A1 | 7/2006 |
| EP | 1 895 341 A1 | 3/2008 |
| EP | 2 025 461 A1 | 2/2009 |

(Continued)

OTHER PUBLICATIONS

International Search Report, dated Aug. 11, 2010, from corresponding PCT application.

*Primary Examiner* — James Greece
(74) *Attorney, Agent, or Firm* — Young & Thompson (57) ABSTRACT

A product (30) for optical use and a method of using the product, which includes at least two splittable superposed layers, namely a transparent and flexible optical layer (31) suitable for sticking onto a lens of an eyeglass frame, and a first packaging layer (35) for packaging the optical layer and presenting stiffness greater than the stiffness of the optical layer so as to enable the product to be machined via a conventional appliance for shaping eyeglass lenses.

15 Claims, 2 Drawing Sheets

(56) References Cited

U.S. PATENT DOCUMENTS

| | | | |
|---|---|---|---|
| 4,883,548 A | 11/1989 | Onoki | |
| 7,036,929 B1 | 5/2006 | Harvey | |
| 2005/0105043 A1* | 5/2005 | Dreher et al. | 351/159 |
| 2010/0259717 A1 | 10/2010 | Fermigier et al. | |

FOREIGN PATENT DOCUMENTS

| | | |
|---|---|---|
| FR | 2 924 819 A1 | 6/2009 |
| WO | 03/025659 A1 | 3/2003 |
| WO | 2007/141402 A1 | 12/2007 |
| WO | 2008/015210 A1 | 2/2008 |

* cited by examiner

PRODUCT COMPRISING A FLEXIBLE OPHTALMIC LENS, AND METHOD FOR MOUNTING SUCH A FLEXIBLE OPHTALMIC LENS ON AN EYEGLASSES LENS

TECHNICAL FIELD TO WHICH THE INVENTION RELATES

The present invention relates in general to flexible ophthalmic lenses for fastening on eyeglass lenses. It relates more particularly to a product for optical use that comprises such a flexible ophthalmic lens and a packaging element for packaging said flexible ophthalmic lens. The invention also relates to a method of mounting the flexible ophthalmic lens on an eyeglass lens.

TECHNOLOGICAL BACKGROUND

Documents U.S. Pat. No. 7,036,929, U.S. Pat. No. 3,628,854, and FR 2 924 819 disclose a thin flexible ophthalmic lens suitable for sticking onto a lens of a pair of eyeglasses. The flexible lens enables the optical characteristics of the pair of eyeglasses to be modified at little expense by adding supplementary optical correction to the eyeglass lens, e.g. because the wearer's visual acuity has diminished. The flexible lens is thus generally put into place on the eyeglass lens after it has already been machined and assembled in the pair of eyeglasses. It is therefore appropriate to begin by cutting the flexible lens so as to bring its outline to the desired shape, i.e. to the shape of the eyeglass lens.

The difficulty is that using an eyeglass lens grinder for machining the flexible lens is not possible because said lens is too flexible. If the flexible lens were to be blocked in a grinder, then the grindwheel would cause the flexible lens to fold instead of machining it.

The solution used at present for bringing the flexible lens to the shape of the eyeglass lens consists in cutting the flexible lens using a pair of scissors or a cutter. It will readily be understood that the accuracy of such a method is approximate and depends to a large extent on the skill of the optician.

That solution is also not viable for flexible lenses that present cylindrical and/or prismatic optical powers. Such lenses need to be oriented angularly very accurately relative to the eyeglass lenses in order to perform correctly the optical functions for which they are designed, and this cannot be achieved manually except by accepting accuracy that is very low and therefore giving rise to poor optical comfort.

OBJECT OF THE INVENTION

The object of the present invention is thus to facilitate and optimize shaping the flexible lens for mounting on an eyeglass lens.

To this end, the invention provides a product for optical use, the product comprising at least three splittable superposed layers, namely:

a transparent and flexible optical layer (corresponding to the "flexible lens") that has two opposite optical faces, one of which is adapted to be applied to an eyeglass lens, and that presents a first characteristic thickness and a first Young's modulus;

a first packaging layer for packaging said optical layer, which first layer is fastened to one of the two optical faces of the optical layer and presents a second characteristic thickness and a second Young's modulus; and a second packaging layer for packaging said optical layer, which second layer is fastened to the other optical face of the optical layer and presents a third characteristic thickness and a third Young's modulus;

wherein, each layer presents a stiffness defined as a linear function of the product of its Young's modulus multiplied by its characteristic thickness, and the first packaging layer presents stiffness that is greater than that of said optical layer and that is suitable for enabling the product to be machined by means of a conventional eyeglass lens shaper appliance, and wherein the optical layer is manually detachable from each packaging layer to enable it subsequently to be fitted on an eyeglass lens.

By means of the invention, the entire product can be blocked in a conventional eyeglass lens shaper appliance and it can then be machined using a conventional shaping method without any need to modify in any manner whatsoever the hardware or the software of said shaper appliance. The accuracy of such a shaper appliance thus makes it possible specifically to cut out the product and thus the flexible lens to have the desired shape. The flexible lens may thus subsequently be extracted from the packaging layer before being applied to an eyeglass lens.

Furthermore, since the first and second packaging layers are designed to be discarded after machining, it is possible to etch or print centering marks on one of the faces of one of the packaging layers.

Such centering marks, corresponding to those that are to be found on an eyeglass lens for machining, are difficult to etch or print on a flexible lens. Nevertheless they make it possible specifically to center said flexible lens.

By means of the invention, the centering marks are easily marked on the first packaging layer. They thus enable the optical frame of reference of the flexible lens to be identified so as to be able to determine how the product is to be shaped, so that once the flexible lens has been fastened on an eyeglass lens it is properly centered relative to the pupil of the wearer's eye and correctly performs the optical function for which it is designed.

Other characteristics of the product of the invention that are advantageous and non-limiting are as follows:

said second packaging layer presents stiffness greater than the stiffness of said optical layer;

said first packaging layer presents at least one centering mark characteristic of the position of the optical frame of reference of said optical layer;

said first packaging layer presents at least one orientation mark characteristic of the orientation of the optical frame of reference of said optical layer;

said packaging layer is transparent;

said optical layer presents varying thickness;

one of the two optical faces of said optical layer presents the shape of a spherical or toroidal cap;

said first packaging layer presents dimensions that are greater than those of said optical layer, and said optical layer presents an edge face that is completely covered by said packaging layer;

each packaging layer presents dimensions equal to those of said optical layer, in such a manner that the edge faces of the optical and packaging layers run on one from another;

each packaging layer presents a circularly cylindrical edge face and a plane support face that faces away from said optical layer;

said first packaging layer presents a Young's modulus (or longitudinal modulus of elasticity) greater than 800 megapascals (MPa) and a thickness at all points that is greater than 1 millimeter;

a protective film is provided that extends around at least a portion of said superposed layers for holding them securely relative to one another; and said protective film carries commercial marking.

The invention also provides a mounting method for mounting an optical layer of such a product on a target eyeglass lens, using an eyeglass lens shaper appliance fitted with an eyeglass lens support and a shaping tool for shaping eyeglass lenses, the method comprising the steps consisting in:

blocking the product on said support;
shaping the product by means of a shaping tool;
extracting the product from the support;
splitting the product; and
applying said optical layer on the target eyeglass lens.

Advantageously, provision may be made for the mounting method to include the prior steps of acquiring the position of a centering mark; and blocking a centering peg on the product at a position that is deduced from the acquired position of said centering mark.

DETAILED DESCRIPTION OF AN EMBODIMENT

The following description with reference to the accompanying drawings given by way of non-limiting example shows clearly what the invention consists in and how it can be reduced to practice.

Figure 1:
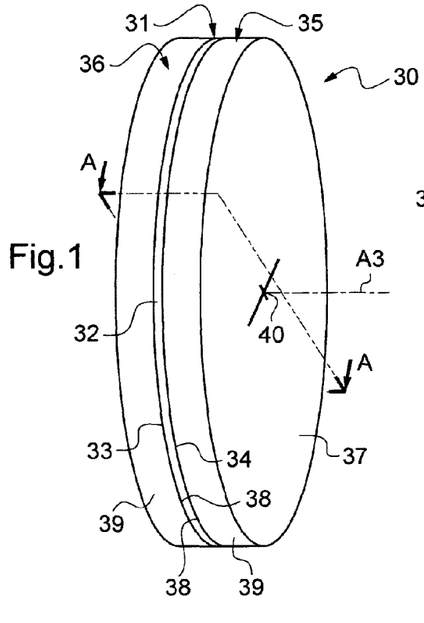
FIG. 1 is a diagrammatic perspective view of a product for optical use of the invention.

In the accompanying drawings:

FIG. 1 shows a product 30 for optical use as it appears initially to an optician on receiving it from the manufacturer.

The product 30 comprises three splittable superposed layers, comprising an optical layer 31 referred to as a flexible lens, and two packaging layers 35 adapted to packaging the flexible lens 31. As shown in FIG. 1, these two packaging layers 35 and 36 sandwich the flexible lens 31 so as to protect it effectively in the event of improper handling during storage or shipping.

Figure 7:
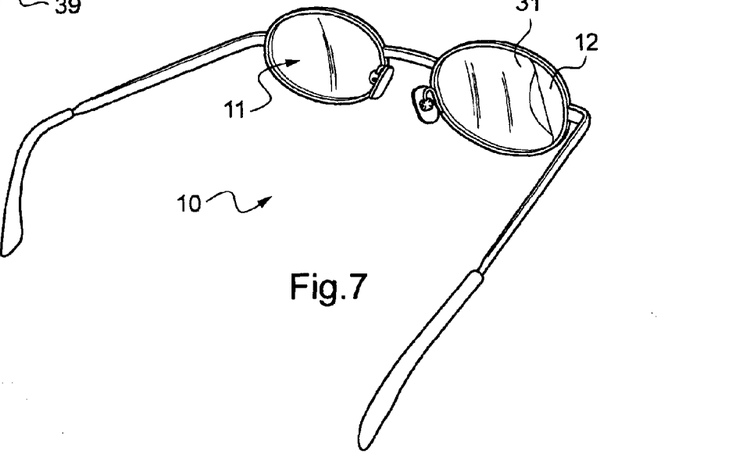
FIG. 7 is a diagrammatic perspective view of a pair of eyeglasses.

These superposed layers 31, 35, 36 are splittable in the sense that they can be separated manually from one another, without such splitting running any risk of tearing the flexible lens 31. Once the various layers 31, 35, and 36 have been separated from one another, the flexible lens 31 must be capable of being applied carefully onto an eyeglass lens 12 in a frame 11 of a pair of eyeglasses 10 (FIG. 7), in order to modify the optical characteristics of the eyeglass lens 12.

Figure 2:
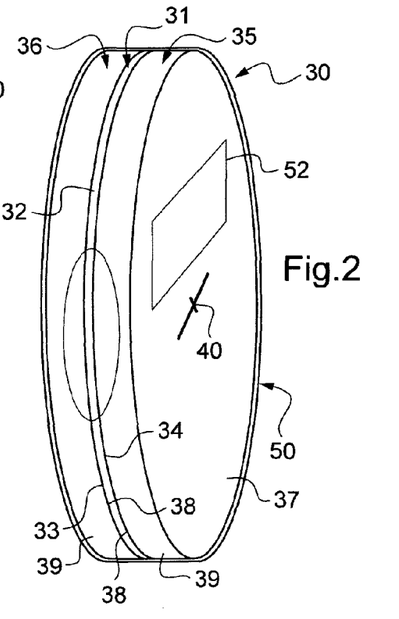
FIG. 2 is a diagrammatic perspective view of the FIG. 1 product for optical use fitted with a protective film.
Figures 3, 4:
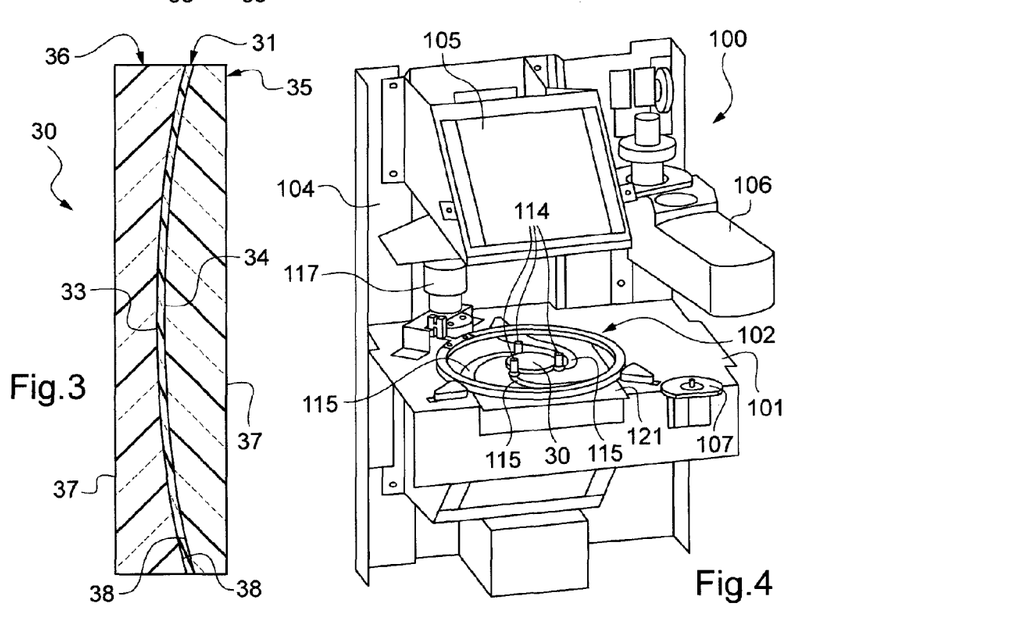
FIG. 3 is a section view on plane A-A of FIG. 1.
FIG. 4 is a general perspective view of a centering and blocking device.

As shown in FIGS. 1 to 3, the flexible lens 31 presents two optical faces 33 and 34 and an edge face 32 of outline that is initially circular.

More precisely, the flexible lens 31 presents an initial diameter that is greater than or equal to 80 millimeters, so as to be capable of being applied on any type of eyeglass lens 12, whatever the dimensions and the camber of the eyeglass lens in question.

In order to be capable of being applied to the eyeglass lens 12, the flexible lens 31 is advantageously made of a material that is transparent and flexible. The material preferably presents hardness lying in the range 70 to 95 on the Shore A scale. By way of example, the flexible lens 31 may be made of thermoplastic polyurethane or of polyvinyl chloride.

Here, the refractive index of the material used is uniform over the entire extent of the flexible lens 31. However the two optical faces 33 and 34 of the flexible lens 31 are not plane. On the contrary, they present the shape of spherical or toroidal caps, both facing in the same direction. They also present in this example maximum radii of curvature lying in the range 53 millimeters to 135 millimeters. These two optical faces 33 and 34 present shapes that are different, such that the thickness of the flexible lens 31 varies between its center and its periphery.

As a result of this variation in thickness, the flexible lens 31 presents refringence properties that enable the refringence properties of the eyeglass lenses 12 to be corrected or supplemented.

These refringence properties are generally defined by spherical, cylindrical, and prismatic optical power values. Here, the flexible lens 31 presents spherical optical power that is non-zero and cylindrical and prismatic optical powers that are zero.

In a variant, provision may be made for the shape and the refringence properties of the flexible lens 31 to be different. By way of example, the flexible lens 31 could constitute a Fresnel lens or a diffractive lens. By way of example, one such flexible lens is described in detail in document FR 2 924 819.

The flexible lens 31 is thus an optical element that presents optical refraction power suitable for mitigating at least in part the visual deficiencies of the wearer of the eyeglass lens on which the flexible lens is to be applied.

Also in a variant, the flexible lens 31 could present an additional function, such as for example conferring a specific tint to the eyeglass lens 12 (anti-UV function) or modifying the mechanical characteristics of the eyeglass lens 12 in the manner of a surface treatment.

The convex optical face 33 of the flexible lens 31 is for applying against the concave optical face of the corresponding eyeglass lens 12. For this purpose, it is smooth and covered in an adhesive coating that is not provided on its concave face 34. In a variant, it is possible on the contrary to provide for the concave optical face 34 of the flexible lens 31 to be the face that is for applying to the eyeglass lens 12, in which case it is only the concave optical face 34 that is covered in an adhesive coating. Also in a variant, provision could be made to apply the adhesive coating not to the flexible lens 31, but directly to the eyeglass lens 12, in which case neither of the two optical faces 33 and 34 of the flexible lens 31 is covered in an adhesive coating.

The packaging layers 35 and 36 form layers for protecting the flexible lens 31. These packaging layers 35 and 36 are thus optically inactive and they are intended to be discarded after the product 30 has been split.

As also shown in FIGS. 1 and 3, each of the two packaging layers 35 and 36 presents a circularly cylindrical edge face 39 about a common axis A3, a plane support face 37 facing away from the flexible lens 31, and a fastening face 38 that is pressed against the corresponding optical face 33, 34 of the flexible lens 31. For this purpose, the fastening face 38 presents the shape of a spherical cap having a radius of curvature that is substantially equal to the radius of curvature of the corresponding optical face 33, 34 of the flexible lens 31.

The packaging layers 35 and 36 present outside diameters such that each packaging layer 35, 36 covers at least two-thirds of the corresponding optical face 33, 34 of the flexible lens 31.

As shown in FIG. 1, the packaging layers 35, 36 present outside diameters that are equal to the outside diameter of the flexible lens 31, such that the edge faces 32, 39 of the packaging layers and of the flexible lens 31 run on one from another.

In a variant, provision could be made for the packaging layers 35, 36 to present outside diameters that are greater than the outside diameter of the flexible lens 31, such that the edge face 32 of the flexible lens 31 is set back from the edge faces 39 of the packaging layers 35, 36 so as to be better protected.

In another variant that is not shown, provision could be made for one and/or the other of the two packaging layers 35 and 36 to present a ridge on its fastening face 38 that runs all along the periphery of said face and that therefore completely covers the edge face 32 of the flexible lens 31 in order to protect it effectively.

At least one of the two packaging layers 35, 36 present stiffness that is greater than the stiffness of the flexible lens 31, suitable for allowing the product 30 to be machined without flexing by using a conventional eyeglass lens shaper appliance that is not modified in any way.

The stiffness (or rigidity) R of a layer (flexible lens or packaging layer) is defined herein as an increasing linear function of the product of its Young's modulus E multiplied by the moment of inertia (second moment of area) of its axial section.

Here, for simplification purposes, the stiffness R of each layer is defined as being equal, ignoring a constant factor, to the product of the Young's modulus E of the layer in question multiplied by a characteristic thickness of said layer.

The characteristic thickness as selected herein for calculating the stiffness R is the minimum thickness of the layer in question. In a variant, it would naturally be possible to calculate the stiffness in some other way, e.g. by taking into considering the mean thickness or the maximum thickness of the layer under consideration.

The mathematical formula for calculating the stiffness R of a layer is thus as follows:

$$R = k \cdot E \cdot e$$

where:

k is a strictly positive constant that is identical for each layer;

E is the Young's modulus of the material of the layer under consideration; and e is the minimum thickness of said layer.

When the layer in question is not made of a single material, but on the contrary is made up of a plurality of sub-layers, each presenting its own Young's modulus, then the Young's modulus E for the layer is considered as being equal to the sum of the Young's moduluses $E_i$ of the sub-layers each weighted by the ratio of its mean thickness $e_i$ divided by the mean thickness e of the layer, using the following formula:

$$E = \text{Sum}(E_i \cdot e_i / e)$$

Here, each of the two packaging layers 35 and 36 presents stiffness that is greater than that of the flexible lens 31. In a variant, provision could be made for only one of the two packaging layers 35, 36 to present stiffness greater than that of the flexible lens 31, the other packaging layer being formed merely by a film designed to protect the flexible lens from the risk of being scratched.

Here, the flexible lens 31 is made of a material presenting a Young's modulus $E_1$ that is less than 1000 MPa.

It also presents a thickness e1 that is at all points greater than or equal to 0.2 millimeters and less than or equal to 3 millimeters.

The two packaging layers 35 and 36 are made of a material that presents a Young's modulus $E_2$, $E_3$ that is greater than 800 MPa.

The two packaging layers 35, 36 also present respective thicknesses $e_2$, $e_3$ that are on average approximately equal to 2 millimeters and that are at all points greater than or equal to 1 millimeter and less than or equal to 5 millimeters. These thicknesses and Young's moduluses are selected in particular in such a manner that each packaging layer 35, 36 presents stiffness that is greater than the stiffness of the flexible lens 31.

the material selected for making the two packaging layers 35 and 36 is a mineral glass or an organic (polycarbonate) glass. In this way, the product 30 is easily machined on a conventional shaper appliance during a blanking and finishing cycle programmed on such an appliance in conventional manner.

The two packaging layers 35 and 36 are arranged to remain stationary relative to the flexible lens 31 regardless of the way in which the product 30 is handled during shipping.

The convex optical face 33 of the flexible lens 31 is adhesively bonded for this purpose to the fastener face 38 of the corresponding packaging layer 36 by means of the adhesive coating that covers it.

The concave optical face 34 of the flexible lens 31 is fastened to the fastening face 38 of the other packaging layer 35 by the adhesive properties that are intrinsic to the material that constitutes it. A fine film of water may also be interposed between the concave optical face 34 of the flexible lens 31 and the fastening face 38 of the packaging layer 35, so as to initiate contact between these two faces 34 and 38.

Provision may also be made to interpose a double-sided adhesive pellet (not shown) between one of the optical faces of the flexible lens and the fastening face of the corresponding packaging layer, in particular in the variant embodiment of the product in which the product has only one packaging layer.

Provision may also be made to interpose a treatment layer between one and/or the other of the optical faces of the flexible lens and the fastening face of the corresponding packaging layer. By way of example, such a treatment layer could, for example, be constituted by an anti-UV layer enabling the rays of the sun to be filtered.

Advantageously, one of the two packaging layers 35 and 36 presents at least one centering mark 40 characteristic of the position of the optical frame of reference of the optical layer 31. This packaging layer may also present at least one orientation mark (generally referred to as an "axis mark" or as an "axis"), such as a line, characteristic of the orientation of the optical frame of reference of said optical layer 31 relative to the horizon when the eyeglass lens 12 is placed on its frame in front of the eye of a wearer in a natural posture.

Provision may also be made to provide a graduation mark on said optical layer such as a protractor for facilitating subsequent inspections by the optician.

The centering mark 40 in this example is constituted by a cross printed on the center of the support face 37 of the packaging layer 35. In a variant it could be etched therein. In this example it indicates the position of the optical center of the flexible lens 31.

This center marking could naturally present some other form. For example, it could present an additional line indicating the orientation of the cylinder axis of the flexible lens if it does presents a cylindrical optical power that is not zero.

The two packaging layers 35 and 36 are also preferably transparent so that the product 30 can be centered and blocked on a conventional centering and blocking device in the same manner as an eyeglass lens, and as described in greater detail below.

The transparency of the two packaging layers 35 and 36 also serves to enable the optical powers of the flexible lens 31 to be inspected using a conventional frontofocometer, through the two packaging layers 35 and 36.

As can be seen in FIG. 2, the product further preferably includes a protective film 50 forming a cover extending around at least a portion of the two packaging layers 35 and 36 in order to hold them securely pressed against the flexible lens 31.

In this example the cover 50 is made of a transparent heat-shrink plastics material. It is initially in the form of a thin tube into which the two packaging layers 35 and 36 are inserted while superposed on the flexible lens 31. On being heated, the cover shrinks onto the packaging layers 35 and 36 so that the product 30 forms a single-piece unit that withstands impacts.

The cover 50 could naturally be made in some other way, preferably out of a transparent material in order to avoid impeding measurements of the optical powers of the flexible lens 31 using a frontofocometer.

The cover 50 in this example presents a commercial marking zone 52 that is offset from the centering mark 40. The values of the optical powers of the flexible lens 31 and the destination address to which the product 30 is sent are printed in this commercial marking zone 52. The cover thus forms wrapping for the product 30, reducing the costs and the volume of the waste that is generated.

In a variant, provision could also be made to print said information directly on one of the packaging layers 35, 36 so as to enable said information to be visible through the transparent cover.

The flexible lens 31 is put into place on the eyeglass lens 12 of the eyeglass frame 11 of the pair of eyeglasses 10 (FIG. 7) in three stages.

During a first stage, the shape of the outline of the eyeglass lens 12 is acquired. By way of example, this stage may be implemented by means of a digital camera, taking a picture in which there can be seen both the pair of eyeglasses 10 seen from in front and also an indicator for specifying the scale of the picture and thus the real size of the eyeglass lens 12. The picture is then transmitted to a computer processor device which deduces therefrom the shape of the outline of the eyeglass lens 12 in the plane of the picture.

During a second stage, the product 30 is centered and blocked on a conventional centering and blocking device. By way of example, one such device is shown in FIG. 4.

The centering and blocking device 100 in this example comprises a support structure 104, a work desk 101 on which a centering mechanism 102 is placed, and a display screen 105 fastened to the support structure 104.

The centering mechanism 102 has a set of at least three concentric clamping jaws 114, each carried by a pivot arm 115 controlled by a motor 117 so as to enable the three jaws 114 to be moved towards one another. The assembly formed by the three arms 115 and the three jaws 114 is placed above a support plate 121 that is adapted to pass light.

The centering and blocking device 100 also includes an automatic positioning arm 106 that is connected to the support structure 104 and that is adapted to use a clamp to take hold of a blocking member that is placed in a container 107 and to place the blocking member at a location on the product 30, which location is determined by calculation.

For this purpose, the centering and blocking device 100 is adapted to detect the position of the centering mark 40 of the product 30. As shown diagrammatically in FIG. 5, it includes for this purpose on either side of the support plate 121, firstly lighting means So, 126, 123 for lighting the support plate 121, and also acquisition and analysis means 122, 125, Ca for acquiring the light transmitted through the support plate 121.

Figure 5:
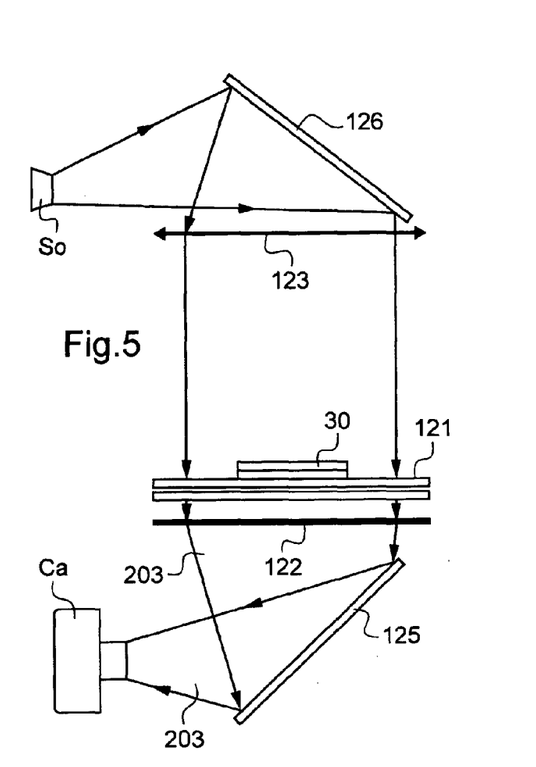
FIG. 5 is an optical diagram of the FIG. 4 device.

In the example shown, the lighting means comprise a light source So, a light-reflector system comprising a mirror 126 inclined at 45°, and a collimator lens 123 adapted to form a parallel light beam propagating towards the support plate 121. The acquisition and analysis means in this example comprise a screen-forming translucent plate 122, a mirror 125 inclined at 45°, a digital camera Ca, and image processor means adapted to process the signal output by the digital camera Ca and the picture obtained of the eyeglass lens.

By positioning the product 30 on the support plate 121, between the jaws 114, the acquisition and analysis means are ready to identify the position of the centering mark 40 printed on the product 30 in order to center it.

This centering operation consists specifically in positioning and orienting the acquired outline of the eyeglass lens 12 in the optical frame of reference of the flexible lens 31 in such a manner as to determine the outline to which the product 30 is to be shaped.

The centering operation is then followed by a stage of blocking the product 30, which consists in positioning a blocking member on the product 30. Thus, when the product 30 with its blocking member is transferred to a shaper appliance, the shaper appliance knows the position of the optical frame of reference of the flexible lens 31, and thus the position of the outline to which the product 30 is to be shaped.

This blocking operation is performed by the centering and blocking device 100 using its positioning arm 106.

During this stage, the positioning arm 106 positions a blocking member on the support face 37 of one of the packaging layers 35, 36 of the product 30 at a given blocking point that is deduced from the position of the centering mark 40. The product is then extracted from the centering and blocking device 100.

The third stage is a stage of shaping the product 30 so as to bring its outline to the desired shape, i.e. the shape of the outline of the eyeglass lens 12. This stage is performed using a conventional shaper appliance. One such shaper appliance that is well known for the purpose to the person skilled in the art is shown diagrammatically and by way of example in FIG. 6.

Figure 6:
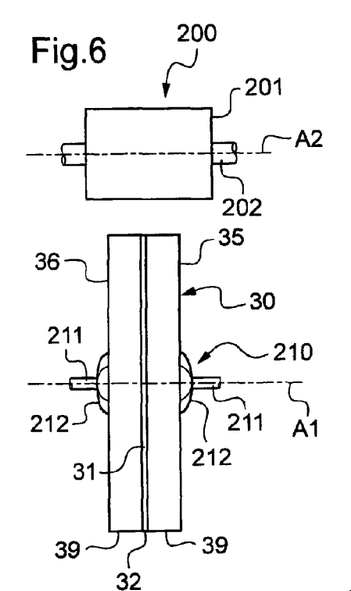
FIG. 6 is a diagrammatic view of a shaper appliance.

The shaper appliance 200 here comprises lens support means 210 adapted to block the product 30. The support means 210 here comprise two support shafts 211 for supporting the product 30 and driving it in rotation about a blocking axis A1. The shaper appliance 200 also includes lens machining means 201 that are thus arranged to machine the edge face of the product 30. Here, the machining means 201 comprise a cylindrical grindwheel 201 mounted on a shaft 202 that rotates about a machining axis A2 parallel to the blocking axis A1.

The cylindrical grindwheel 201 and/or the support means 210 are provided with the ability to move radially, thereby enabling the spacing between the machining axis A2 and the blocking axis A1 to be varied in order to bring the edge face of the product 30 to the desired shape.

The shaper appliance 200 also includes an electronic and/or computer device (not shown) that is provided firstly with means for communicating with the centering and blocking device 100, and secondly with means for controlling said radial movement. The electronic and/or computer device is capable in particular of controlling the radial spacing between the edge face of the cylindrical grindwheel 201 and the blocking axis A1 in each angular position of the product 30 about the blocking axis A1.

In order to machine the product 30, it is initially blocked between the ends 212 of the shafts 211 of the support means 210. If it includes a cover 50, there is no need to remove the cover before blocking the product 30.

A conventional machining cycle is then started. During this cycle, the electronic and/or computer device uses its means for communicating with the centering and blocking device 100 to acquire the machining parameters for the product 30 so as to control the radial movement of the shafts 211 relative to the grindwheel 201 in order to shape the product 30 with the desired shape.

Once this operation has been completed, the product 30 is extracted from the support means 210. It is then manually split into three portions. The cover 50 and the two packaging layers 35, 36 are discarded. In contrast, the flexible lens 31 is applied to the rear face of the eyeglass lens 12 so that its outline coincides with the outline of the eyeglass lens 12. In a variant, the flexible lens 31 could be applied, on the contrary, to the front face of the eyeglass lens 12.

The invention claimed is:

1. A product (30) for optical use, the product comprising at least three splittable superposed layers, namely:
    a transparent and flexible optical layer (31) that has two opposite optical faces (33, 34), one of which is adapted to be applied to an eyeglass lens, and that presents a characteristic thickness (e1) and a Young's modulus (E1);
    a first packaging layer (35) for packaging said optical layer (31), which first packaging layer (35) is fastened to one of the two optical faces (33, 34) of the optical layer (31) and presents a characteristic thickness (e2) and a Young's modulus (E2); and
    a second packaging layer (36) for packaging said optical layer (31), which second packaging layer (36) is fastened to the other optical face (33, 34) of the optical layer (31) and presents a characteristic thickness (e3) and a Young's modulus (E3);
    wherein, each layer (31, 34, 35) presents a stiffness defined as a linear function of the product of its Young's modulus multiplied by its characteristic thickness, and said first packaging layer (35) presents stiffness that is greater than the stiffness of said optical layer (31) and that is suitable for enabling the product (30) to be machined by means of an eyeglass lens shaper appliance (200), and wherein the optical layer (31) is manually detachable from each packaging layer (35, 36) to enable it subsequently to be fitted on an eyeglass lens.

2. A product according to claim 1, wherein said second packaging layer (36) presents stiffness greater than the stiffness of said optical layer (31).

3. A product according to claim 1, wherein said first packaging layer (35) presents at least one centering mark (40) characteristic of the position of the optical frame of reference of said optical layer (31).

4. A product according to claim 1, wherein said first packaging layer (35) presents at least one orientation mark characteristic of the orientation of the optical frame of reference of said optical layer (31).

5. A product according to claim 1, wherein each packaging layer (35, 36) is transparent.

6. A product according to claim 1, wherein said optical layer (31) presents varying thickness.

7. A product according to claim 1, wherein one of the two optical faces (33, 34) of said optical layer (31) presents the shape of a spherical or toroidal cap.

8. A product according to claim 1, wherein said first packaging layer (35) presents dimensions that are greater than those of said optical layer (31), and wherein said optical layer (31) presents an edge face (32) covered by said first packaging layer (35).

9. A product according to claim 1, wherein each packaging layer (35, 36) presents dimensions equal to those of said optical layer (31), in such a manner that the edge faces of the optical and packaging layers run on one from another.

10. A product according to claim 1, wherein each packaging layer (35, 36) presents a circularly cylindrical edge face (39) and a plane support face (37) that faces away from said optical layer (31).

11. A product according to claim 1, wherein said first packaging layer (35) presents a Young's modulus greater than 800 MPa and a thickness at all points that is greater than 1 millimeter.

12. A product according to claim 1, including a protective film (50) that extends around at least a portion of said superposed layers (31, 35, 36) for holding them securely relative to one another.

13. A product according to claim 12, wherein said protective film (50) carries commercial marking (52).

14. A mounting method for mounting an optical layer (31) of a product (30) on a target eyeglass lens, using an eyeglass lens shaper appliance (200) fitted with an eyeglass lens support (210) and a shaping tool (201) for shaping eyeglass lenses,
    wherein the product (30) includes (a) the optical layer (31) that is transparent and flexible and has two opposite optical faces (33, 34), one of which is adapted to be applied to an eyeglass lens, the optical layer (31) presenting a characteristic thickness (e1) and a Young's modulus (E1); (b) a first packaging layer (35) for packaging said optical layer (31), said first packaging layer (35) being fastened to one of the two optical faces (33, 34) of the optical layer (31) and presenting a characteristic thickness (e2) and a Young's modulus (E2); and (c) a second packaging layer (36) for packaging said optical layer (31), said second packaging layer (36) being fastened to the other optical face (33, 34) of the optical layer (31) and presenting a characteristic thickness (e3) and a Young's modulus (E3); wherein, each said layer (31, 34, 35) presents a stiffness defined as a linear function of the product of its Young's modulus multiplied by its characteristic thickness, and said first packaging layer (35) presents a stiffness that is greater than the stiffness of said optical layer (31) and that is suitable for enabling the product (30) to be machined by means of the eyeglass lens shaper appliance (200), and wherein the optical layer (31) is manually detachable from each packaging layer (35, 36) to enable it subsequently to be fitted on the target eyeglass lens,
    the method comprising the steps of:
    blocking the product (30) on said support (210);
    shaping the product (30) by means of said shaping tool (201);
    extracting the product (30) from the support (210);
    splitting the product (30); and
    applying said optical layer (31) on the target eyeglass lens.

15. A mounting method according to claim 14, including the prior steps of:
   acquiring the position of a centering mark (40) situated on the first packaging layer (35); and
   blocking a centering accessory on the product (30) at a position that is deduced from the acquired position of said centering mark (40).

\* \* \* \* \*

UNITED STATES PATENT AND TRADEMARK OFFICE
CERTIFICATE OF CORRECTION

PATENT NO. : 8,714,739 B2  
APPLICATION NO. : 13/319416  
DATED : May 6, 2014  
INVENTOR(S) : Pierre Rouault De Coligny Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 184 days.

Signed and Sealed this

Twenty-ninth Day of September, 2015

Michelle K. Lee  
*Director of the United States Patent and Trademark Office*